(12) United States Patent
Kim et al.

(10) Patent No.: US 10,791,274 B2
(45) Date of Patent: Sep. 29, 2020

(54) CAMERA MODULE CAPABLE OF WIDE-ANGLE SHOOTING NORMAL-ANGLE SHOOTING AND MOBILE TERMINAL HAVING THE SAME

(71) Applicant: LG ELECTRONICS INC., Seoul (KR)

(72) Inventors: Jongpil Kim, Seoul (KR); Hakhae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 64 days.

(21) Appl. No.: 15/773,863

(22) PCT Filed: Nov. 4, 2015

(86) PCT No.: PCT/KR2015/011750
§ 371 (c)(1),
(2) Date: May 4, 2018

(87) PCT Pub. No.: WO2017/078189
PCT Pub. Date: May 11, 2017

(65) Prior Publication Data
US 2019/0158750 A1    May 23, 2019

(51) Int. Cl.
| | |
|---|---|
| *H04N 5/232* | (2006.01) |
| *G02B 13/00* | (2006.01) |
| *G03B 5/00* | (2006.01) |
| *G02B 3/14* | (2006.01) |
| *G03B 13/36* | (2006.01) |
| *H04N 5/225* | (2006.01) |
| *H04N 5/217* | (2011.01) |

(Continued)

(52) U.S. Cl.
CPC .......... *H04N 5/23296* (2013.01); *G02B 3/14* (2013.01); *G02B 13/0045* (2013.01); *G03B 3/10* (2013.01); *G03B 5/00* (2013.01); *G03B 13/36* (2013.01); *H04N 5/217* (2013.01); *H04N 5/2253* (2013.01); *H04N 5/2254* (2013.01); *H04N 5/247* (2013.01); *G03B 2205/0046* (2013.01); *G03B 2205/0061* (2013.01)

(58) Field of Classification Search
CPC ............. H04N 5/23296; H04N 5/2254; H04N 5/2253; H04N 5/217; H04N 5/247; G03B 13/36; G03B 5/00; G03B 3/10; G03B 2205/0046; G03B 2205/0061; G02B 3/14; G02B 13/0045
See application file for complete search history.

(56) References Cited

U.S. PATENT DOCUMENTS

| | | | |
|---|---|---|---|
| 9,335,514 B2 * | 5/2016 | Hsieh ................. | G02B 27/0025 |
| 2007/0002455 A1 | 1/2007 | Berge et al. | |

(Continued)

*Primary Examiner* — Luong T Nguyen
(74) *Attorney, Agent, or Firm* — Birch, Stewart, Kolasch & Birch, LLP

(57) ABSTRACT

Disclosed are a camera module and a mobile terminal having the same. The camera module includes: a first lens assembly with a variable focal length; a second lens assembly that is provided under the first lens assembly, spaced apart therefrom, and corrects for spherical aberration of the first lens assembly; and an image sensor provided under the second lens assembly, wherein the second lens assembly corrects for spherical aberration of the first lens assembly according to the field of view (FOV) of the first lens assembly.

14 Claims, 10 Drawing Sheets

(51) Int. Cl.
 *H04N 5/247* (2006.01)
 *G03B 3/10* (2006.01)

(56) References Cited

U.S. PATENT DOCUMENTS

| | | |
|---|---|---|
| 2011/0134303 A1 | 6/2011 | Jung et al. |
| 2013/0077168 A1 | 3/2013 | Gutierrez et al. |
| 2013/0114148 A1 | 5/2013 | Aschwanden et al. |
| 2014/0104696 A1 | 4/2014 | Moreau et al. |
| 2015/0085135 A1* | 3/2015 | Chen ................ G02B 9/62 |
| | | 348/164 |
| 2016/0209629 A1* | 7/2016 | Hsieh ................ G02B 27/0025 |
| 2017/0329105 A1* | 11/2017 | Lee ................ G02B 9/60 |
| 2018/0275399 A1* | 9/2018 | Zhang ................ G02B 27/0075 |

\* cited by examiner

[Fig. 1a]
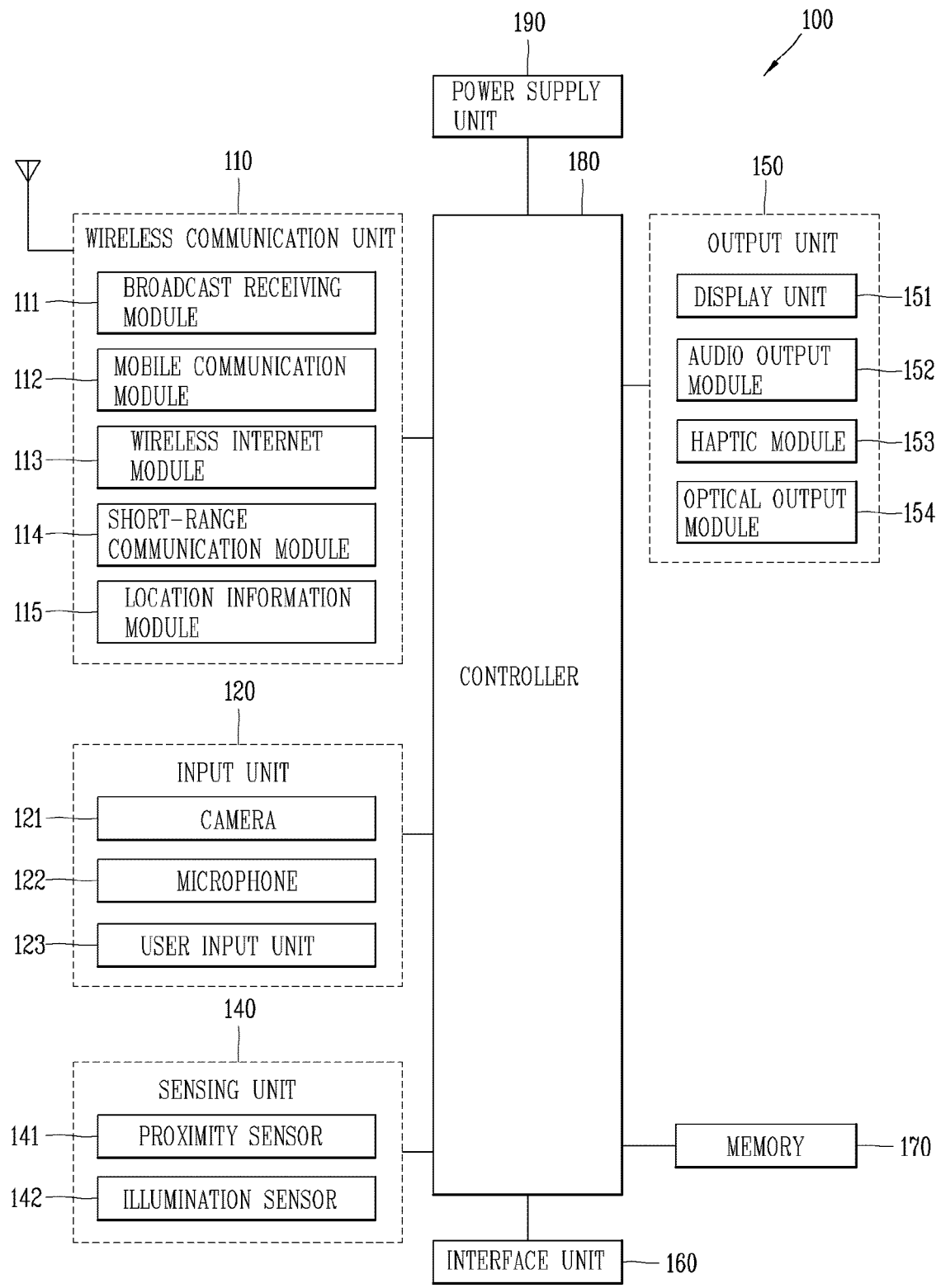

[Fig. 1b]
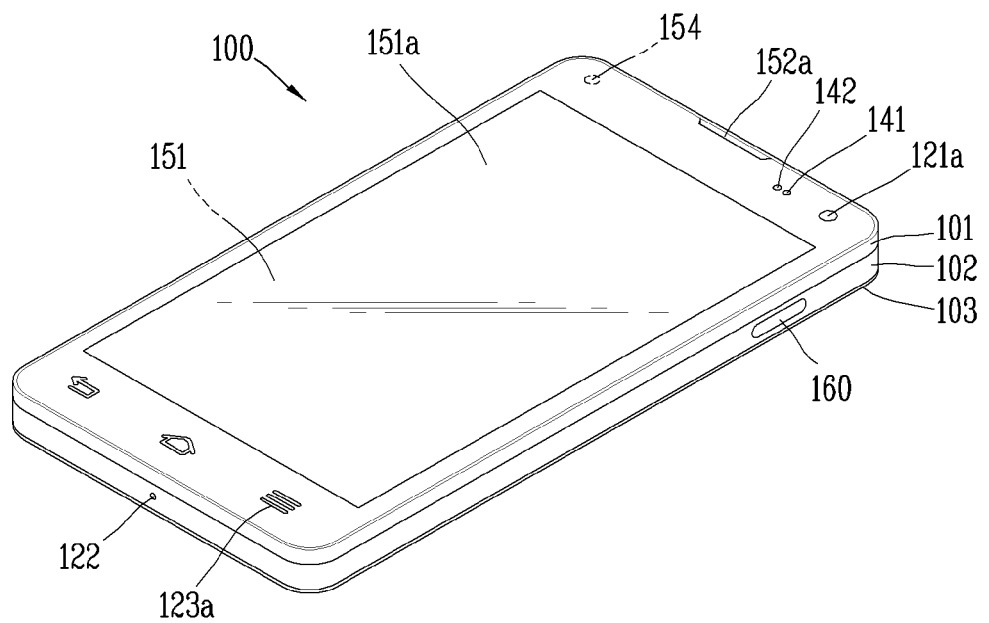
[Fig. 1c]
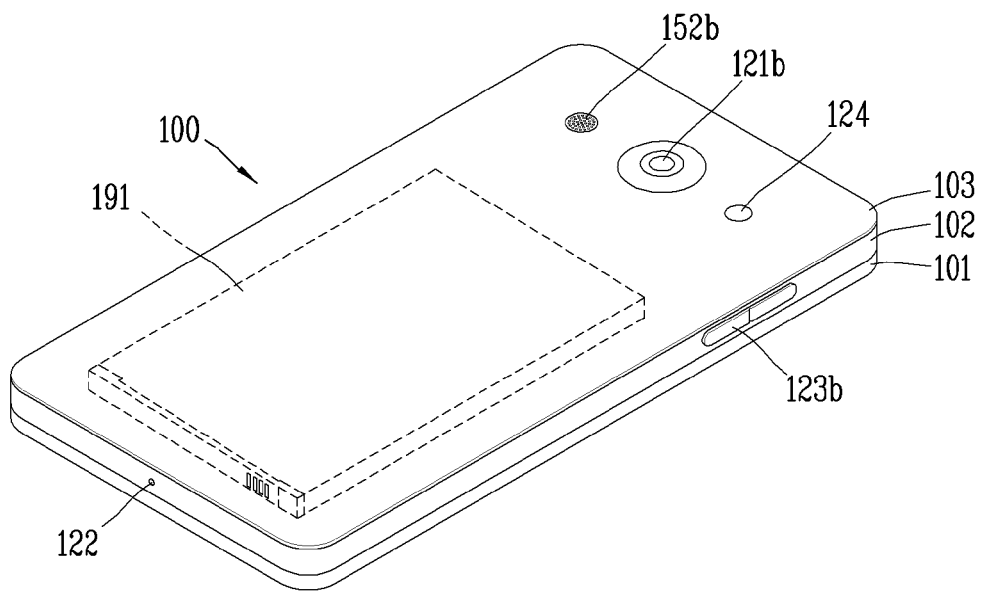

[Fig. 2a]
--PRIOR ART--
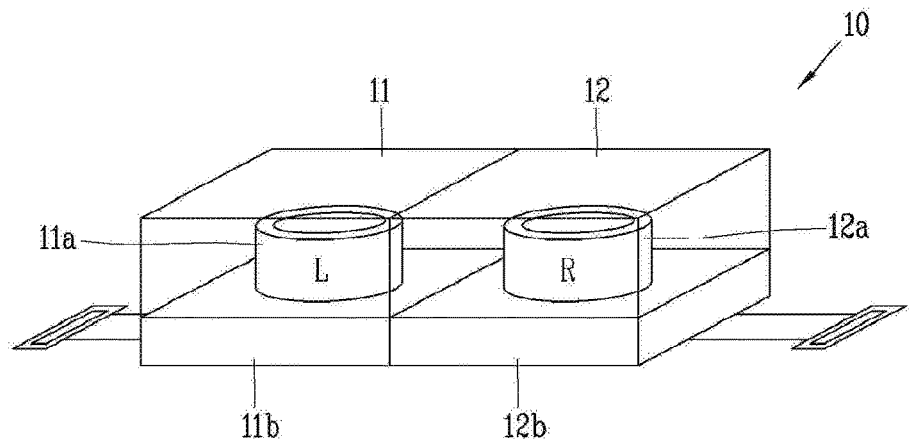
[Fig. 2b]
--PRIOR ART--
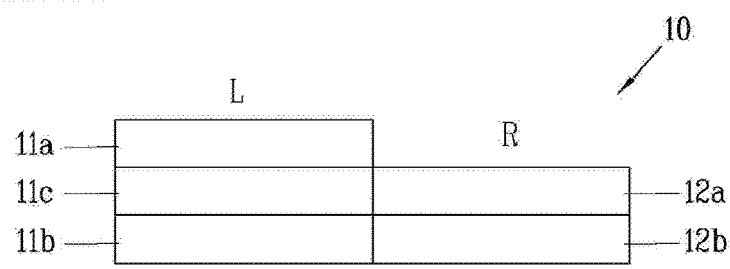
[Fig. 3a]
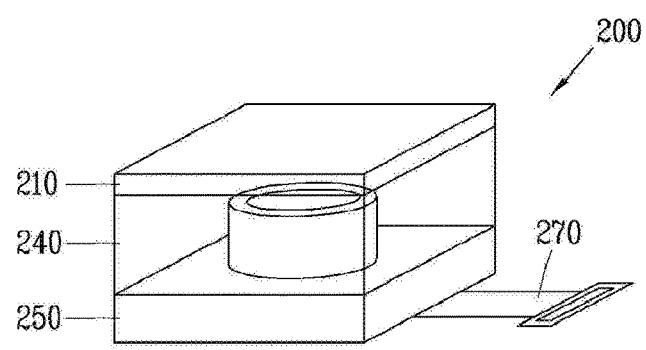
[Fig. 3b]
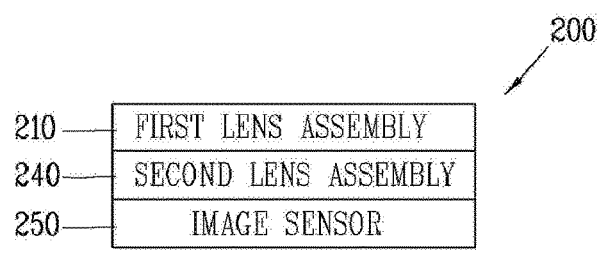

[Fig. 4a]
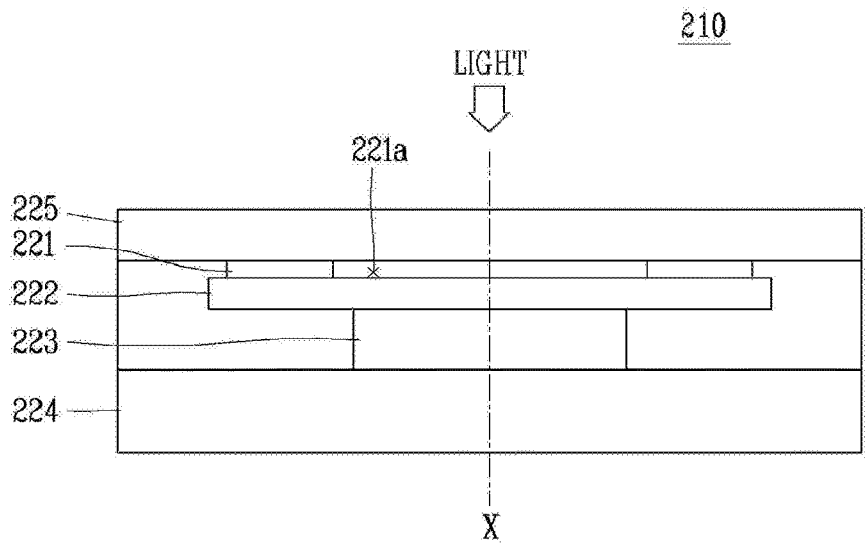
[Fig. 4b]
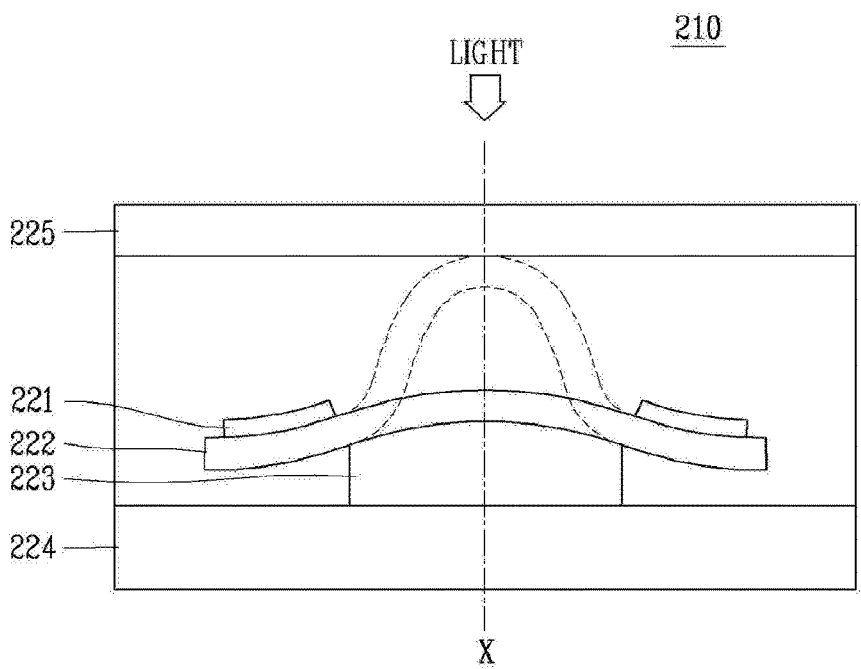
[Fig. 5]
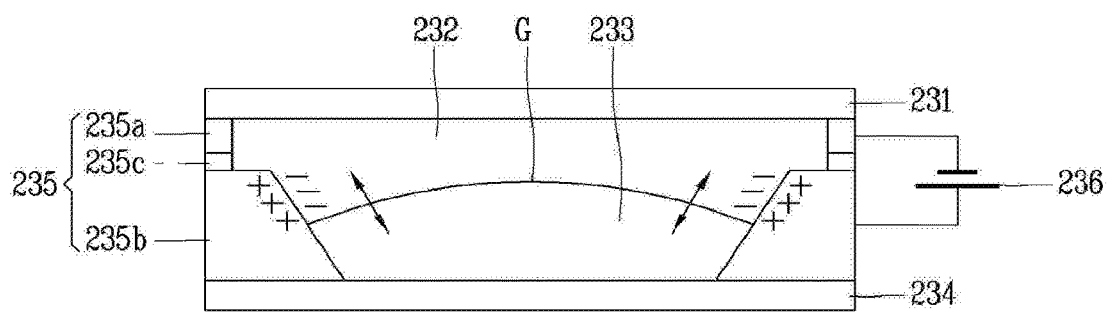

[Fig. 6]
| 210 — | FIRST LENS ASSEMBLY |
| 240 — | SECOND LENS ASSEMBLY |
| 260 — | ACTUATOR(OIS) |
| 250 — | IMAGE SENSOR |
[Fig. 7]
| 210 — | FIRST LENS ASSEMBLY |
| 240 — | SECOND LENS ASSEMBLY |
| 250 — | IMAGE SENSOR |
[Fig. 8]
| 210 — | FIRST LENS ASSEMBLY |
| 240 — | SECOND LENS ASSEMBLY |
| 250 — | IMAGE SENSOR |
| 260 — | ACTUATOR(OIS) |
[Fig. 9]
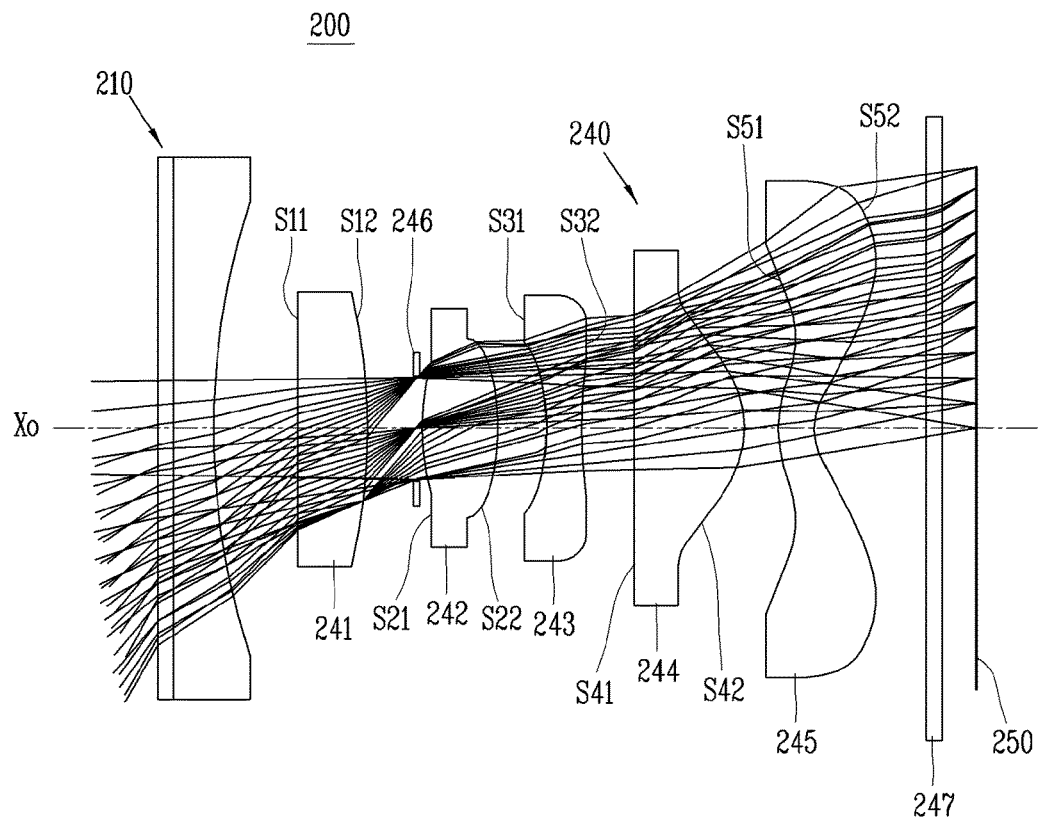

[Fig. 10a]
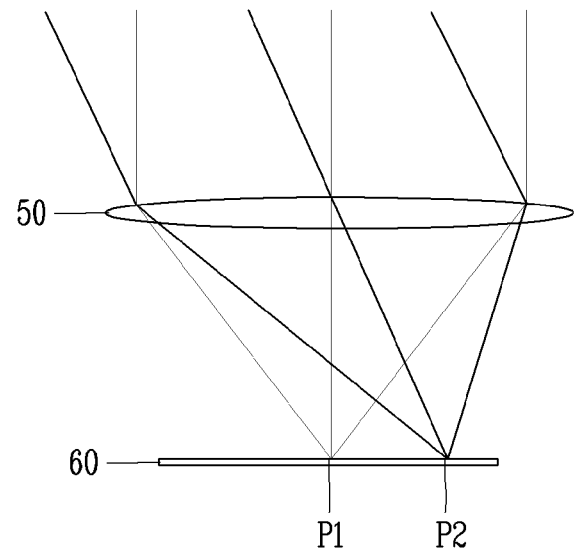
[Fig. 10b]
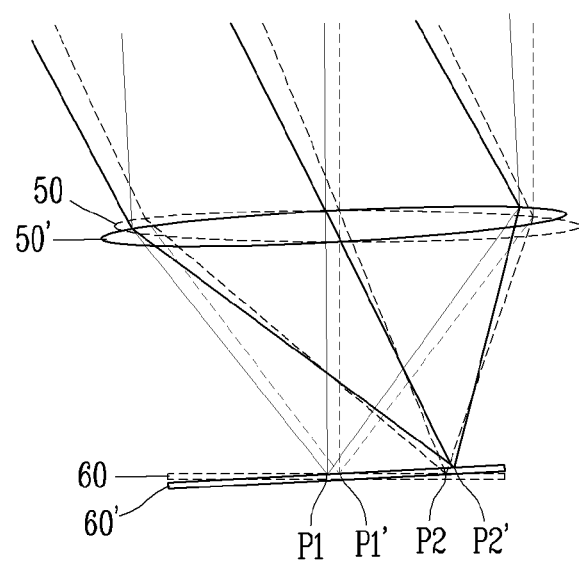

[Fig. 11a]
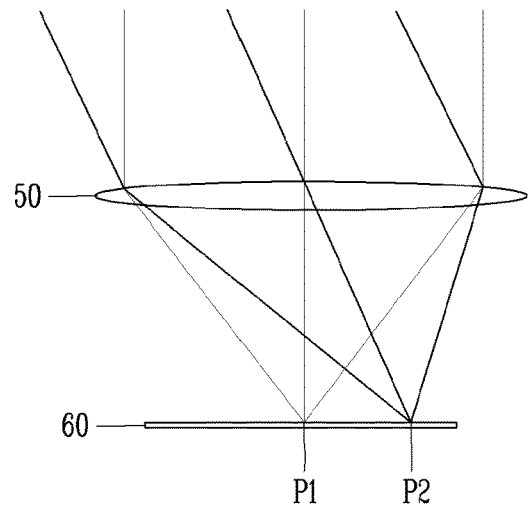
[Fig. 11b]
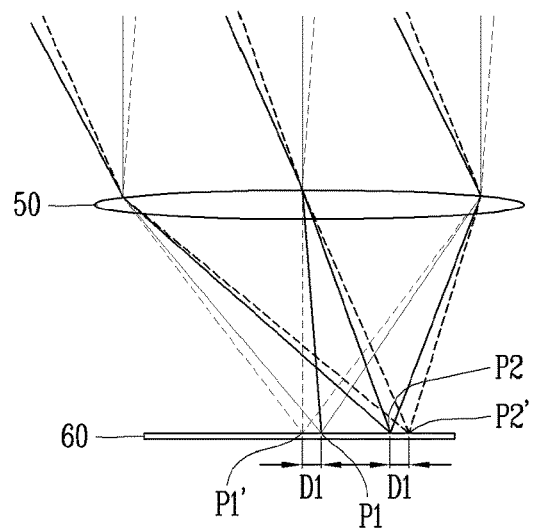
[Fig. 12]
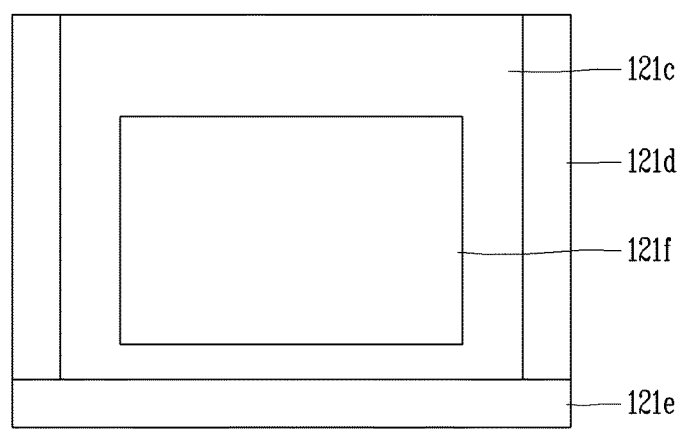

[Fig. 13]
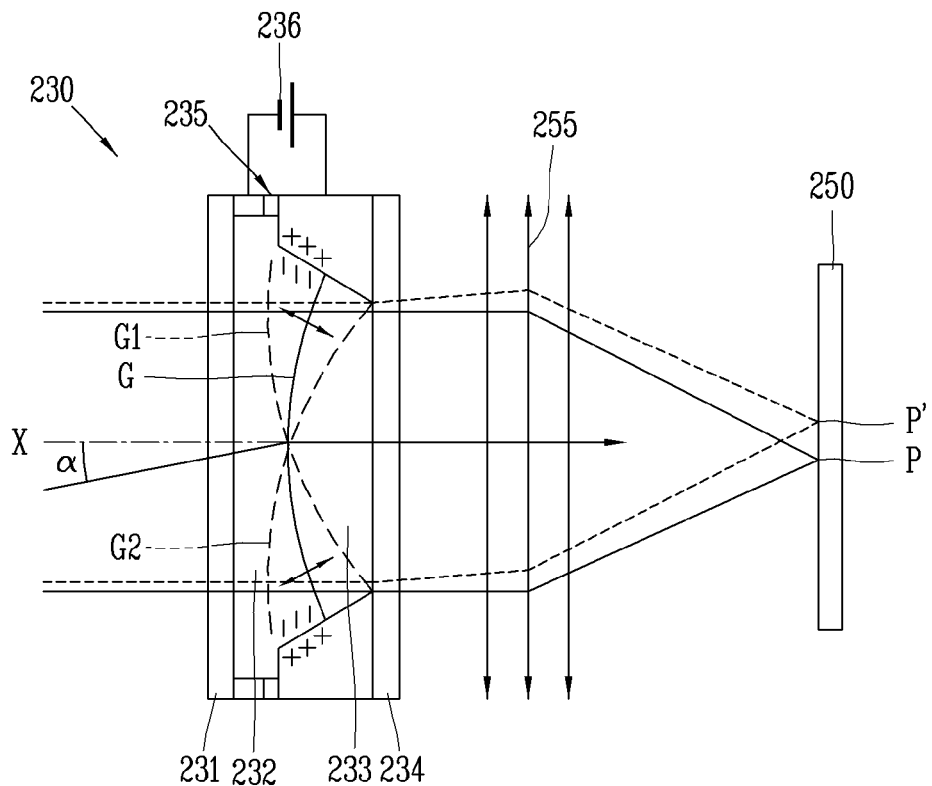
[Fig. 14]
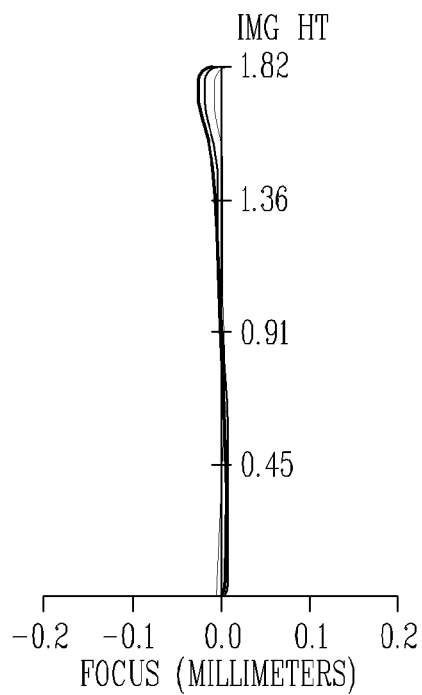

[Fig. 15]
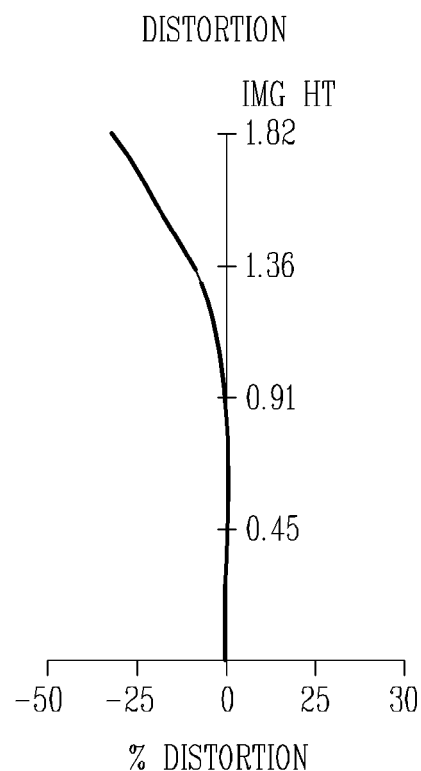
[Fig. 16a]
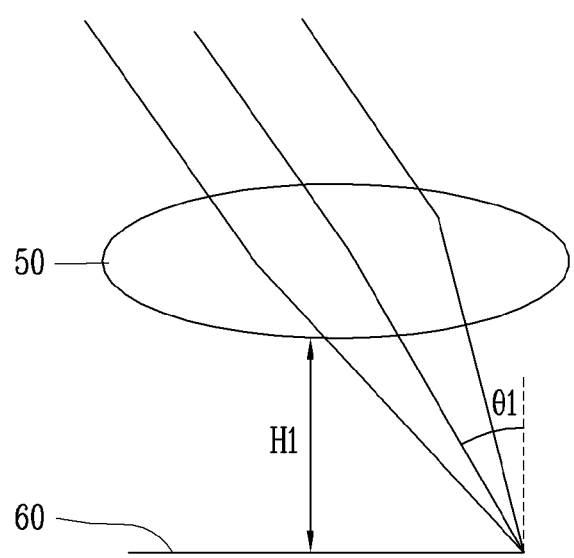

[Fig. 16b]
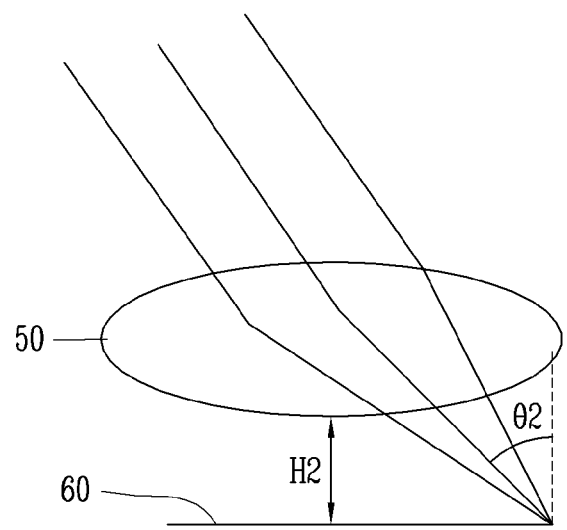

CAMERA MODULE CAPABLE OF WIDE-ANGLE SHOOTING NORMAL-ANGLE SHOOTING AND MOBILE TERMINAL HAVING THE SAME

CROSS REFERENCE TO RELATED APPLICATIONS

This application is the National Phase of PCT International Application No. PCT/KR2015/011750, filed on Nov. 04, 2015, which is herby expressly incorporated by reference into the present application.

TECHNICAL FIELD

The present invention relates to a camera module capable of wide-angle shooting and a mobile terminal having the same.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

To capture a normal field of view (FOV) and a wide field of view, a lens for normal-angle shooting and a lens for wide-angle shooting are respectively required. That is, conventionally, a lens part with a lens for normal-angle shooting and a lens part for wide-angle shooting are mounted and used separately. For example, FIG. 2A is a schematic diagram of a conventional dual camera module. Referring to FIG. 2A, it can be seen that a first lens part 11 for normal-angle shooting and a second lens part 12 for wide-angle shooting are separately provided.

Using two lens parts 11 and 12 separately depending on the field of view the user wants to capture will result in an increase in the size and price of the camera module and double the number of connector pins or connecting terminals that control the camera module in conjunction with a mobile terminal. This makes the digital image processing algorithm more complex.

Besides, a convex lens is often provided on the outermost part for wide-angle shooting. This leads to the problem of the convex lens protruding outwards.

DISCLOSURE OF INVENTION

Technical Problem

Therefore, an object of the present invention is to solve the above-mentioned problems and other problems. Another object of the present invention is to provide a camera module capable of shooting a wide field of view as well as a normal field of view by a single camera module and a mobile terminal having the same.

Solution to Problem

To achieve these and other advantages and in accordance with the purpose of the present invention, as embodied and broadly described herein, one exemplary embodiment of the present invention provides a camera module including: a first lens assembly with a variable focal length; a second lens assembly that is provided under the first lens assembly, spaced apart therefrom, and corrects for spherical aberration of the first lens assembly; and an image sensor provided under the second lens assembly, wherein the second lens assembly corrects for spherical aberration of the first lens assembly according to the field of view (FOV) of the first lens assembly.

In one aspect of the present invention, the first lens assembly may include: a piezo film with a through hole that bends in response to an electrical signal applied thereto; a glass membrane that is provided under the piezo film and bends into a shape corresponding to the piezo film a polymer lens that is provided under the glass membrane and formed in an area corresponding to the through hole, with its top surface being deformable into a shape corresponding to the bottom surface of the glass membrane and a glass support provided under the polymer lens.

In one aspect of the present invention, the first lens assembly may include: an upper substrate; a first liquid provided under the upper substrate a second liquid provided under the first liquid and having a lower density than the first liquid; a lower substrate provided under the second liquid; and a voltage application part that is formed on both sides of the first and second liquids and applies a voltage to the first and second liquids and varies the shape of an interface between the first liquid and the second liquid.

In one aspect of the present invention, the voltage application part may include: a first metal member placed in contact with the first liquid; a second metal member provided under the first metal member and placed in contact with the second metal member, some part of which is placed in contact with the first liquid; and an insulation member that is provided between the first and second metal members and insulates the first and second metal members.

In one aspect of the present invention, the camera module may further include an actuator that is provided between the second lens assembly and the image sensor and aligns the optical axes of the first and second lens assemblies with the center of the image sensor.

In one aspect of the present invention, the first lens assembly may be an actuator that aligns the optical axes of the first and second lens assemblies with the center of the image sensor.

In one aspect of the present invention, the camera module may further include an actuator that is provided under the image sensor and aligns the optical axes of the first and second lens assemblies with the center of the image sensor.

In one aspect of the present invention, the second lens assembly may include: a first lens having a positive (+) refractive power a second lens having a positive (+) refractive power a third lens having a negative (−) refractive power a fourth lens having a positive (+) refractive power; a fifth lens having a negative (−) refractive power; and an aperture provided between the first and second lenses, all of which are arranged in order of proximity to the first lens assembly.

In one aspect of the present invention, the first and third lenses may have a refractive index of 1.6 or higher.

In one aspect of the present invention, at least one side of the first to fifth lenses may be aspherical.

In one aspect of the present invention, the first lens may satisfy the following expression (1):

$$0.1 < |K1/Kt| < 0.5 \qquad (1)$$

where K1 is the refractive power of the first lens, Kt is the refractive power of the second lens assembly, and the refractive power is equal to 1/focal length (f).

In one aspect of the present invention, the second lens may satisfy the following expression (2):

$$0.5 < |K2/Kt| < 1.0 \qquad (2)$$

where K2 is the refractive power of the second lens, Kt is the refractive power of the second lens assembly, and the refractive power is equal to 1/focal length (f).

In one aspect of the present invention, the third lens may satisfy the following expression (3):

$$0.3 < |K3/Kt| < 1.0 \qquad (3)$$

where K3 is the refractive power of the third lens, Kt is the refractive power of the second lens assembly, and the refractive power is equal to 1/focal length (f).

In one aspect of the present invention, the fourth lens may satisfy the following expression (4):

$$1.0 < |K4/Kt| < 1.5$$

where K4 is the refractive power of the fourth lens, Kt is the refractive power of the second lens assembly, and the refractive power is equal to 1/focal length (f).

In one aspect of the present invention, the fifth lens may satisfy the following expression (5):

$$0.5 < |K5/Kt| < 1.0$$

where K5 is the refractive power of the fifth lens, Kt is the refractive power of the second lens assembly, and the refractive power is equal to 1/focal length (f).

In one aspect of the present invention, the wider the field of view (FOV), the smaller the radius of curvature of the first lens assembly.

In one aspect of the present invention, the first lens assembly may perform an autofocus function by varying the lens thickness, if the field of view is 100 degrees or more, and perform a wide-field-of-view shooting function by keeping the lens thickness constant, if the field of view is more than 100 degrees.

Another exemplary embodiment of the present invention provides a mobile terminal including: a camera module; and a terminal body having the camera module, the camera module including: a first lens assembly with a variable focal length; a second lens assembly that is provided under the first lens assembly, spaced apart therefrom, and corrects for spherical aberration of the first lens assembly; and an image sensor provided under the second lens assembly, wherein the second lens assembly corrects for spherical aberration of the first lens assembly according to the field of view (FOV) of the first lens assembly.

Advantageous Effects of Invention

The advantageous effects of the mobile terminal and a control method thereof according to the present invention are as follows:

At least one of the embodiments of the present invention offers the advantage of manufacturing a single camera module by placing a lens assembly with a variable focal length more on the outside and a wide-angle shooting lens assembly with a fixed focal length on the inside, and aligning the optical axes of the two lens assemblies with each other.

At least one of the embodiments of the present invention offers the advantage of shooting a wide field of view as well as a normal field of view by a single camera module by adjusting the lens thickness depending on the diopter or the field of view.

At least one of the embodiments of the present invention offers the advantage of preventing the camera module's lens from protruding outwards since a lens assembly with protruding lenses are placed on the inside.

An additional scope of applicability of the present invention will be apparent from the following detailed description. However, it may be appreciated by those of ordinary skill in the art that various changes and modifications may be made thereto without departing from the spirit and scope of the present invention, and it should be noted that the specific embodiments set forth herein are provided only for an example.

BRIEF DESCRIPTION OF DRAWINGS

FIG. 1A is a block diagram for explaining a mobile terminal related to the present invention;

FIGS. 1B and 1C are conceptual diagrams of an example of the mobile terminal related to the present invention when viewed from different directions;

FIG. 2A is a schematic view of a conventional dual camera module, and FIG. 2B is a conceptual view of FIG. 2A;

FIG. 3A is a schematic view of a camera module according to one embodiment of the present invention, and FIG. 3B is a conceptual diagram of FIG. 3A;

FIGS. 4A and 4B are schematic views of a first lens assembly according to one embodiment of the present invention;

FIG. 5 is a schematic view of another first lens assembly according to one embodiment of the present invention;

FIGS. 6 to 8 are conceptual diagrams of a camera module according to one embodiment of the present invention;

FIG. 9 illustrates a lens array of a camera module according to one embodiment of the present invention;

FIGS. 10A and 10B are views for explaining optical axis correction using a module tilt method;

FIGS. 11A and 11B are views for explaining optical axis correction using a lens shift method;

FIG. 12 is a view for explaining the barrel shift method according to one embodiment of the present invention;

FIG. 13 is a view for explaining the barrel shift method using a liquid lens according to one embodiment of the present invention;

FIG. 14 is a graph showing astigmatic field curves of a second lens assembly according to one embodiment of the present invention;

FIG. 15 is a graph showing measurements of distortion of the second lens assembly according to one embodiment of the present invention; and FIGS. 16A and 16B are views for explaining chief ray angle (CRA) variation with distance between a lens assembly and an image sensor.

BEST MODE FOR CARRYING OUT THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a unibody is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or re-arranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, embodiments related to a camera module 200 and a mobile terminal 100 having the camera module 200 will be described with reference to the accompanying drawings. It is obvious to those skilled in the art that this invention can be embodied in other specific forms without departing from the spirit and essential features of the present invention.

First of all, FIG. 2A is a schematic view of a conventional dual camera module 10, and FIG. 2B is a conceptual view of FIG. 2A. Conventionally, as shown in FIGS. 2A and 2B, a first lens part 11 for normal-angle shooting and a second lens part for wide-angle shooting are provided to form a single camera module 10. That is, the first lens part 11 for normal-angle shooting is an AF (autofocus) type with an autofocus feature. A first optical lens part 11a is provided on the top of the first lens part 11, an actuator 11c for adjusting the focus of the first optical lens part 11a is provided under the first optical lens part 11a, and a first image sensor 11b is provided under the actuator 11c. The second lens part 12 for wide-angle shooting is an FF (fixed focus) type, in which a second optical lens part 12a is provided on the top and a second image sensor 12b is provided under the second optical lens part 12a. By the way, there is a difficulty in mounting both the lens part 11 for normal-angle shooting and the lens part 12 for wide-angle shooting in a narrow space. The first and second lens parts 11a and 12a may be a combination of multiple lenses.

To overcome the above-mentioned problem, the camera module 200 according to one embodiment of the present invention includes a first lens assembly 210 that is externally exposed and allows the lens to vary in thickness and have various diopters (or fields of view) by voltage application, a second lens assembly 240 that is provided under the first lens assembly 210 and corrects for spherical aberration of the first lens assembly 210 by varying the diopter (or field of view) of the first lens assembly 210, and an image sensor 250 provided under the second lens assembly 240 and for converting an optical signal entering through the first and second lens assemblies 210 and 240 into an electrical signal.

In one embodiment of the present invention, a diopter D is the reciprocal of the focal length of a lens, which is equal to 1,000/focal length (f) of the lens and has the same meaning as a field of view. The focal length is measured in mm.

FIG. 3A is a schematic view of a camera module 200 according to one embodiment of the present invention, and FIG. 3B is a conceptual diagram of FIG. 3A. Referring to FIGS. 3A and 3B, a cylindrical second lens assembly 240 is provided under a first lens assembly 210. The first lens assembly 210 and the second lens assembly 240 may be spaced a predetermined distance apart from each other, and the second lens assembly 240 may be attached to the image sensor 250. FIG. 3A illustrates the second lens assembly 240 as having a cylindrical shape, which is a conceptual view of a number of lenses that are expressed in an exaggerated fashion. Thus, the second lens assembly 240 is not necessarily limited to the cylindrical shape.

The image sensor 250 may be electrically connected to a main circuit board (not shown) of a mobile terminal 100 by a flexible printed circuit board (FPCB) 270 and controlled by a controller 180. For example, the controller 180 adjusts the lens thickness of the first lens assembly 210 depending on whether it is in wide-angle shooting mode or normal-angle shooting mode. More specifically, in the case of normal-angle shooting using the camera module 200, the lens thickness of the first lens assembly 210 is adjusted for autofocusing, whereas, in the case of wide-angle shooting, the lens thickness of the first lens assembly 210 is not varied.

In one embodiment of the present invention, the first lens assembly 210 is implemented using a polymer lens or a liquid lens. If the first lens assembly 210 includes a polymer lens 223, the curvature of the polymer lens 223 is varied using a piezo film 221. If the first lens assembly 210 includes a liquid lens, the curvature of an interface G between two liquids is varied by applying a voltage to the two liquids with different densities.

FIGS. 4A and 4B are schematic views of the first lens assembly 210 according to one embodiment of the present invention, which illustrate the use of the polymer lens 223. FIG. 4A illustrates the shape of the first lens assembly 210 in a first state according to one embodiment of the present invention, and FIG. 4B illustrates the shape of the first lens assembly 210 in a second state according to one embodiment of the present invention. In one embodiment of the present invention, the first state is a state in which the lens thickness of the first lens assembly 210 is not varied, for example, the polymer lens 223 remains flat, not affected by the polymer lens 223 due to the piezo film 221. Also, in the case of the liquid lens, the first state is a state in which the interface G between the two liquids 232 and 233 forms a plane.

On the other hand, in one embodiment of the present invention, the second state is a state in which the lens thickness is varied by the application of a voltage to the first lens assembly 210. For example, in the case of the polymer lens 223, the second sate is a state in which the polymer lens 223 has a certain curvature due to the piezo film 221, and in the case of the liquid lens, the second state is a state in which the interface G between the two liquids 232 and 233 form a curved surface.

Hereinafter, the first lens assembly 210 using the polymer lens 223 according to one embodiment of the present invention will be described with reference to FIGS. 4A and 4B.

If the first lens assembly 210 includes the polymer lens 223, the first lens assembly 210 includes a piezo film 221 with a through hole 221a that bends in response to an electrical signal applied to it, a glass membrane 222 that is provided under the piezo film 221 and bends into a shape corresponding to the piezo film 221, a polymer lens 223 that is provided under the glass membrane 222 and formed in an area corresponding to the through hole 221a, with its top surface being deformable into a shape corresponding to the bottom surface of the glass membrane 222, and a glass support 224 provided under the polymer lens 223.

In this instance, a cover glass 225 may be provided above the piezo film 221. The cover glass 225 and the glass support 224 may function as supports for making the first lens assembly 210 into a module.

The center of the through hole 221a and the center of the polymer lens 223 are formed on the same axis, and this axis is an optical axis X. That is, in the first lens assembly 220 using the polymer lens 223, light enters through the through hole 221a, passes through the glass membrane 222, the polymer lens 223, and the glass support 224, and enters the second lens assembly 240 placed under the first lens assembly 220. In this case, the light that has passed through the first lens assembly 210 may have spherical aberration since the polymer lens 223 acts as a spherical lens.

Since the polymer lens 223 is in close contact with the glass membrane 222, it bends in the way the glass membrane 222 bends and has a certain curvature. For example, while no voltage is applied to the piezo film 221, the piezo film 221 is flat and the glass membrane 222 and the polymer lens 223 are flat as well. In this case, the focus of the polymer lens 223 is not varied. The first lens assembly 210 has a diopter of 0, and wide-angle shooting is enabled by using the second lens assembly 240.

On the other hand, as shown in FIG. 4B, when a voltage is applied to the piezo film 221, the shape of the piezo film 221 is deformed and this causes deformation of the shape of the glass membrane 222 that is placed in contact with the piezo film 221. Also, the deformation of the glass membrane 222 leads to deformation of one side of the polymer lens 223. In this way, the focus of the polymer lens 223 is changed. In the first lens assembly 210, the thickness or curvature of the polymer lens 223 is adjusted in order to adjust the focus with a field of view of 70 to 80 degrees.

As the applied voltage gets higher, the curvature of the polymer lens 223 becomes smaller and the polymer lens 223 becomes more convex. That is, the higher the diopter, the smaller the radius of curvature of the first lens assembly 210.

FIG. 5 is a schematic view of another first lens assembly 210 according to one embodiment of the present invention, which illustrates the formation of a first lens assembly 230 using a liquid lens. This will be described below with reference to FIG. 5.

As shown in FIG. 5, a liquid lens assembly 230 according to one embodiment of the present invention includes an upper substrate 231 made of glass, a first liquid 232 provided under the upper substrate 231, a second liquid 233 provided under the first liquid 232 and having a lower density than the first liquid 232, a lower substrate 234 provided under the second liquid 233 and made of glass, and a voltage application part 235 that applies a voltage to the first and second liquids 232 and 233 and varies the shape of an interface G between the first liquid 232 and the second liquid 233.

The upper substrate 231 and the lower substrate 234 are structures for forming a lens assembly 230 using the first and second liquids 232 and 233. The first and second liquids 232 and 233 are provided between the upper substrate 231 and the lower substrate 234, and the first and second liquids 232 and 233 have different densities and form a certain interface G between them as the first liquid 232 with higher density is positioned over the second liquid 233. For example, the first liquid 232 may be water and the second liquid 233 may be oil, but the present invention is not limited to this example.

The voltage application part 235 includes a first metal member 235a placed in contact with the first liquid 232, a second metal member 235b provided under the first metal member 235a and placed in contact with the second metal member 235b, some part of which is placed in contact with the first liquid 232, and an insulation member 235c that is provided between the first and second metal members 235a and 235b and insulates the first and second metal members 235a and 235b. As the first and second metal members 235a and 235b are insulated from each other, the application of a voltage to the first and second metal members 235a and 235b leads to accumulation of charge on the surface of contact between the first liquid 232 and the second metal member 235b, causing a change in surface tension. Accordingly, the curvature of the interface G between the first liquid 232 and the second liquid 233 changes, and this curvature can be controlled by adjusting the intensity of the applied voltage. The first liquid 232 may function as a convex lens or concave lens depending on the direction of curvature, which is enabled by electrowetting.

That is, in the case of the first lens assembly 230 using a liquid lenses, the interface G is convex downward due to the self-weight and surface tension of the first liquid 232 in a first state in which no voltage is applied from a power source 236, whereas the interface G is convex upward in a second state in which a voltage is applied. FIG. 5 depicts the second state. As such, the focus of the first lens assembly 210 can be adjusted depending on the magnitude of the applied voltage.

In one embodiment of the present invention, the camera module 200 performs the AF (autofocus) function if the diopter of the first lens assembly 210 is 100 or less, and performs an ultra-wide mode shooting function if the diopter of the first lens assembly 210 is more than 100. More specifically, the camera module 200 performs a wide-angle shooting function if the diopter of the first lens assembly 210 is in the range of 100 to 130. If the diopter is more than 100, more preferably, 110, the depth of field is infinite and hence there is no need to change the thickness of the first lens assembly 210 by AF.

That is, in the case of the camera module 200 according to one embodiment of the present invention, if the FOV is 70 to 80 degrees, the lens thickness of the first lens assembly 210 is adjusted for autofocusing. However, if the FOV is adjusted to a wide angle of 100 to 130 degrees, everything is in focus and therefore it is not necessary to adjust the lens thickness of the first lens assembly 210. With everything being in focus, the depth of field is infinite, and the lens whose thickness is to be adjusted is a polymer lens 223 or liquid lenses 232 and 233.

As can be seen above, in one embodiment of the present invention, autofocus (AF) is enabled by the polymer lens 223 or the liquid lenses 232 and 233. Autofocus is available for close-up shooting from 1 cm or less away as well, which allows for detection of the user's fingerprint by capturing it. As such, user authentication can be implemented by capturing the user's fingerprint, without a fingerprint sensor. Besides, the camera module 200 enables the use of applications such as fingerprint registration, password setting and deleting, payment, etc. that can be dealt with by fingerprints.

The depth of field is determined by the focal length (f) of the lens, the aperture (A) or f-number (N) of the lens, and the camera-to-subject distance D. In the case of the camera module 200 provided in the mobile terminal 100, the focal length and the lens aperture are fixed, so the depth of field 2NCS2/f2. The f-number is a factor for representing the brightness of an optical system, which is determined by the effective aperture and focal length (FOV) of the lens and has a value of f/A. In this case, with the same focal length, the larger the lens aperture, the more light the lens lets in, and with the same aperture, the longer the focal length, the more light the lens lets in. That is, a smaller f-number allows more light to be let in through the lens in the same field of view, thus making the optical system brighter.

The only way to decrease the depth of field in the above formula is to reduce the distance from the subject. One embodiment of the present invention, however, gives a higher degree of freedom in depth-of-field adjustment since the focal length as well as the distance from the subject can be adjusted.

If the first lens assembly 210 is used in combination with a normal lens, the polymer lens 223 or liquid lenses 232 and 233 serves as a spherical lens due to their shape while the first lens assembly 210 is autofocusing. Thus, only the center of the image is in autofocus and the periphery of the image has spherical aberration occurring in the spherical lens.

To solve this problem, one embodiment of the present invention proposes a lens structure capable of compensating for spherical aberration that can occur in the polymer lens 223 or liquid lenses 232 and 233 serving as a spherical lens due to their shape and a lens structure including a wide-angle lens as well. That is, the camera module 200 according to one embodiment of the present invention includes a first lens assembly 210 that performs mostly the AF function, and a second lens assembly 240 that performs mostly the wide-angle shooting function. That is, for a field of view from 70 to 80 degrees, which is a normal shooting angle, the focal length is adjusted by adjusting the lens thickness of the first lens assembly 210, and for a field of view of 100 degrees or more for wide-angle shooting, the focal length of the first lens assembly 210 is not varied and wide-angle shooting is achieved by the first and second lens assemblies 240 with a fixed focal length.

Moreover, in one embodiment of the present invention, a camera module 200 that does not protrude outward is provided by using the polymer lens 223 or the liquid lenses 232 and 233 as the first lens assembly 210.

Meanwhile, the first lens assembly 210 may require optical axis correction to correct for hand-shake or the like. To this end, an OIS (Optical Image Stabilizer) is needed. Examples of OIS methods include a module tilt method and a barrel shift method. The module tilt method is to tilt the camera module 200, and the barrel shift method is to shift the lens barrel. The barrel shift method also may be referred to as a lens shift method since the lens is shifted by the lens barrel.

FIGS. 10A and 10B are views for explaining optical axis correction using a module tilt method, and FIGS. 11A and 11B are views for explaining optical axis correction using a barrel shift method.

First of all, a description will be made with reference to FIGS. 10A and 10B. FIG. 10A illustrates an optical path without hand-shake. That is, when there is no hand-shake, an image is formed at given positions P1 and P2 on an image sensor 60 through a lens 50. On the other hand, as shown in FIG. 10B, unlike FIG. 10A, when there is hand-shake, light is let in through a lens 50' to form an image at different positions P1' and P2' on an image sensor 60'.

In this case, the module tilt method can change the optical path by tilting the lens 50 and the image sensor 60. The module tilt method is disadvantageous in that the shifting structure is of relatively large size since the entire camera module needs to be tilted, and in that an interference with the flexible printed circuit board can occur.

Now, the optical axis correction using the lens shift method will be described with reference to FIGS. 11A and 11B. FIG. 11A illustrates an optical path without hand shake, and FIG. 11B illustrates a change to the optical path caused by hand-shake. Unlike the module tilt method, the lens shift method is a method of changing the optical path by shifting the lens 50 alone while the image sensor 60 is fixed. Thus, as shown in FIG. 11B, correction strokes D1 and D2 for correcting the positions P1' and P2' where an image is formed are generated.

FIG. 12 is a view for explaining the barrel shift method according to one embodiment of the present invention, which illustrates a schematic view of the camera modules 121a and 121b of FIGS. 1A and 1B.

A camera module 200 for the barrel shift method includes a lens assembly 121f, a lens barrel 121c, an actuator 121d, and an image sensor 121e. Although not shown, the camera module 121 further includes a printed circuit board (not shown) that processes a signal from the image sensor 121e, and a bobbin (not shown) attached to the lens barrel 121c and having a coil wound around it.

The lens assembly 121f, which consists of a plurality of lenses arranged in a row along the optical axis, is a device that refracts light so that a large amount of light is directed from a point on a subject and collected at one position. Light entering from a point in a straight line passes through the lenses and is collected at one position, and the light is collected to form an image. The distance between the image sensor 121e where the image is formed and the lenses is called the focal length.

The lens barrel 121c serves as a housing for protecting the lens assembly 121f, and moves along the optical axis as the actuator 121d is driven. The actuator 121d performs the autofocus (AF) function by shifting the lens barrel 121c and the bobbin along the optical axis by an electromagnetic force on the coil. The actuator 121d may be composed of a voice coil motor.

The image sensor 121e is spaced apart from the lens assembly 121f, and converts an optical signal input through the lens assembly 121f into an electrical signal. The image sensor 121e may be a CCD (Charge Coupled Device) or a CMOS (Complementary Metal Oxide Semiconductor).

FIG. 13 is a view for explaining the barrel shift method using a liquid lens according to one embodiment of the present invention.

Referring to FIG. 13, if the optical axis X does not coincide with the center of the image sensor 250 due to hand-shake when shooting in the second state, the position of an image formed on the image sensor 250 may be corrected from P to P' by tilting the liquid lens assembly 230. That is, the optical axis of light let in through a lens 255 may be corrected by tilting the interface G from G1 to G2. It can be seen that the optical axis correction results in a certain amount of correction stroke. This shows that the interface G between the first and second liquids 232 and 233 is tilted at a certain angle α with respect to the optical axis X. By this process, an image captured with shaky hands can be corrected.

Meanwhile, the first lens assembly 210 according to one embodiment of the present invention may be either a polymer lens 223 using a piezo film 221 or a liquid lens. The polymer lens 223 may function as an AF actuator, and the liquid lens may function as an OIS actuator.

That is, both the barrel shift method and the module shift method are available because the polymer lens 223 has no OIS function. On the other hand, only the barrel shift method is available for the liquid lens, and the module shift method is available only when the OIS actuator 260 is provided under the image sensor 250 as shown in FIG. 8.

In one embodiment of the present invention, both the OIS function and the AF function may be implemented. FIGS. 6, 7, and 8 depict a lens assembly associated with OIS.

First of all, referring to FIG. 6 and FIG. 3B, it can be seen that the OIS actuator 260 is added between the second lens assembly 240 and the image sensor 250. The actuator 260 is a type of actuator 260 that aligns the optical axes of the first lens assembly 210 and second lens assembly 240 with the center of the image sensor 250. On the other hand, the first lens assembly 210 shown in FIG. 7 includes a liquid lens with the OIS function to ensure that the optical axis of the first lens assembly 210 is aligned with the center of the image sensor 250 according to the barrel shift method.

FIG. 7 illustrates that the liquid lens assembly 230 is used as the first lens assembly 210. As illustrated therein, the first lens assembly 210 is provided on the top so that it performs both the AF function and the OIS function.

Moreover, FIG. 8 illustrates that the actuator 260 for optical axis correction is provided under the image sensor 250 so that the optical axes of the first and second lens assemblies 210 and 240 are aligned with the center of the image sensor 250 according to the module shift method. The first lens assembly 210 of FIG. 8 may be either the polymer lens assembly 220 or the liquid lens assembly 230.

To sum up, the liquid lens has both the AF function and the OIS (Optical Image Stabilizer) function, and may correct the optical axis of the first lens assembly 210 by the barrel shift method or the module tilt method, whereas the polymer lens 223 does not have the OIS function but only the OIS function and therefore has to implement the OIS function by a particular means, for example, either by the barrel shift method or by the module tilt method.

FIG. 9 illustrates a lens array of the camera module 200 according to one embodiment of the present invention, which is a view for explaining the construction of the first and second lens assemblies 210 and 240. Referring to FIG. 9, the thicknesses, sizes, and shapes of the lenses are exaggerated to some extent for ease of description, and spherical or aspherical shapes are merely an example and the present invention is not limited to this example.

Referring to FIG. 9, the second lens assembly 240 according to one embodiment of the present invention has an array in which a first lens 241, an aperture 246, a second lens 242, a third lens 243, a fourth lens 244, a fifth lens 245, an infrared filter 247, and an image sensor 250 are arranged in order of proximity to an object.

Light corresponding to image information of a subject passes through the first lens assembly 210, the first lens 241, the aperture 246, the second lens 242, the third lens 243, the fourth lens 244, the fifth lens 245, and the infrared filter 247 and enters the image sensor 250.

The aperture 246 is positioned between the first lens 241 and the second lens 242 and adjusts the amount of light entering the optical system. In another embodiment, the aperture 246 may be placed in front of the first lens 241, between the first lens assembly 210 and the second lens assembly 240, or may be placed between other lenses.

The first to fifth lenses 241, 242, 243, 244, and 245 may be made of a plastic material with a predetermined refractive index. Accordingly, a reduction in the manufacturing cost of the second lens assembly 240 and its mass production can be achieved by making all the lenses of the second lens assembly 240 with a plastic material.

Moreover, the lenses can have higher resolution and deliver superior aberration characteristics by using an aspherical lens for at least one side or both sides of the first to fifth lenses 241, 242, 243, 244, and 245.

In describing the construction of each lens, the term "object side" refers to a side of the lens facing the object with respect to the optical axis, and the term "image side" refers to a side of the lens facing an image plane with respect to the optical axis XO. That is, the first to fifth lenses 241, 242, 243, 244, and 245 have object sides S11, S21, S31, S41, and S51 and image sides S12, S22, S32, S42, and S52, respectively.

The first lens 241 has a positive (+) refractive power, the object side S11 has a planar shape, and the image side S12 is convex. The second lens 242 has a positive (+) refractive power, the object side S21 is convex, and the image side S22 is more convex than the object side S21. The third lens 243 has a negative (−) refractive power, and the object side S31 is concave. In one embodiment of the present invention, the chief ray angle (CRA) on the image plane is increased to ensure that an image of sufficient size is acquired despite the short distance between the second lens assembly 240 and the image sensor 250. To this end, a highly refractive plastic material with a refractive index of 1.6 or higher may be used for the first to third lenses 241, 242, and 243.

The fourth lens 244 has a positive (+) refractive power, and the fifth lens 245 has a negative (−) refractive power. The image side S42 of the fourth lens 244 is convex, and both the object side S51 and image side S52 of the fifth lens 245 are convex. In this case, the fifth lens 245 is aspherical by which both the object side S51 and the image side S52 have an inflection point.

The second lens assembly 240 increases the chief ray angle (CRA) on the image plane by using the third and fifth lenses 243 and 245 having a negative refractive power. Accordingly, high resolution can be maintained even with a slim structure where the distance between the second lens assembly 240 and the image sensor 250 is short.

For instance, FIGS. 16A and 16B are views for explaining chief ray angle (CRA) variation with distance between a lens assembly 50 and an image sensor 60. As shown in FIGS. 16A and 16B, to create a slimmer lens structure under the condition that the size of the image sensor 60 and the number of pixels are the same, the chief ray angle (CRA) on the image plane 60 should be increased from θ1 to θ2. To increase the chief ray angle (CRA), it is necessary to properly select the lenses 243 and 245 with negative refractive power from the second lens assembly 240 and scatter the light coming from the object onto the image sensor 60. In this way, the distance between the lens assembly 50 and the image sensor 60 is decreased from H2 to H1. Hence, the camera module can be made slimmer.

FIG. 9 will be explained more concretely. Light collected through the first and second lenses 241 and 242 with positive refractive power is scattered over a sufficient area through the third lens 243 with negative refractive power. Then, the light let in through the third lens 243 is collected again through the fourth lens 244 with positive refractive power to increase and correct the resolution. Finally, the light, with the increased and corrected resolution, is scattered again through the fifth lens 245 with negative refractive power, thereby acquiring a bright image of sufficient size despite the short distance between the second lens assembly 240 and the image sensor 250.

In this case, the infrared filter 247 (IR filter) functions to block radiant heat emitted from external light to prevent it from being transferred to the image sensor 250. Also, the infrared filter passes visible light and reflects and lets out infrared light. The infrared filter is in the form of a coating film, and placed between the fifth lens 245 and the image sensor 250.

In this case, the image sensor 250 converts an optical signal entering through the aperture 246, the first to fifth lenses 241, 242, 243, 244, and 245, and the infrared filter 247 to an electrical signal.

The conditional expressions to be explained below are a preferred embodiment for enhancing the operational effects of the lens assemblies. It will be apparent to those skilled in the art that the present invention is not necessarily limited to the following conditional expressions. For example, the lens construction of the present invention may provide enhanced operational effects as long as some of the following conditional expressions are satisfied.

$0.1 < |K1/Kt| < 0.5$ [Conditional Expression 1]

$0.5 < |K2/Kt| < 1.0$ [Conditional expression 2]

$0.3 < |K3/Kt| < 1.0$ [Conditional expression 3]

$1.0 < |K4/Kt| < 1.5$ [Conditional expression 4]

$0.5 < |K5/Kt| < 1.0$ [Conditional expression 5]

where K1, K2, K3, K4, and K5 are the refractive power of the first to fifth lenses 241, 242, 243, 244, and 245, respectively, and Kt is the refractive power of all the lenses. Refractive power is denoted by 1/focal length (f) of lens.

conditional expression 1, the refractive power of the first lens 241 divided by the refractive power of all the lenses has an absolute value between 0.1 and 0.5, and according to the conditional expressions 2 to 5, the refractive power of each of the second to fifth lenses 242, 243, 244, and 245 divided by the refractive power of all the lenses has an absolute value within a predetermined range.

In addition, the aspherical shape mentioned in the embodiments of the present invention is obtained according to a known Equation 1, where κ denotes Conic constant and 'E and its continuing number' used in aspheric coefficients A, B, C, D, E, and F denotes the power to which 10 is to be raised. For example, E+1 indicates $10^1$, and E−02 indicates $10^{-2}$.

$$Z = \frac{cY^2}{1 + \sqrt{1-(1+k)c^2Y^2}} + AY^4 + BY^6 + CY^8 + DY^{10} + EY^{12} + FY^{14}$$ [Equation 1]

where Z: distance along optical axis from lens vertex c: reciprocal of radius (r) of curvature at lens vertex Y: distance perpendicular to optical axis κ: Conic constant A, B, C, D, E, F: aspheric coefficients The following Table 1 shows first to fifth lenses 241, 242, 243, 244, and 245 of a lens assembly according to a first embodiment of the present invention.

The first to fifth lenses 241, 242, 243, 244, and 245 are designed to satisfy the above-described conditional expressions.

TABLE 1

| | | F-number: 2.4 HFOV: 60 Total focal length: 1.55 | | | | | |
|---|---|---|---|---|---|---|---|
| Lens | Surface | Radius of curvature | Thickness | Refractive index | Abbe Number | Focal length | Conditional expression |
| First lens | First surface | −252.714025 | 0.758757 | 1.63242 | 23.35 | 9.346645 | 0.165835 |
| | Second surface | −5.782625 | 0.100000 | | | | |
| Second lens | First surface | 1.781893 | 0.516090 | 1.528208 | 54 | 2.147156 | 0.721885 |
| | Second surface | −2.807596 | 0.047301 | | | | |
| Third lens | First surface | −4.812029 | 0.250000 | 1.63242 | 23.35 | −2.58907 | 0.59867 |
| | Second surface | 2.531845 | 0.110658 | | | | |
| Fourth lens | First surface | −53.777642 | 0.743170 | 1.528208 | 54 | 1.259662 | 1.230489 |
| | Second surface | −0.660371 | 0.096812 | | | | |
| Fifth lens | First surface | 0.697611 | 0.250000 | 1.528208 | 54 | −2.12479 | 0.729485 |
| | Second surface | 0.376918 | 0.476612 | | | | |

The conditional expressions 1 to 5 define the refractive power of the first to fifth lenses 241, 242, 243, 244, and 245 of the second lens assembly 240 according to embodiments of the present invention. Accordingly, the first to fifth lenses 241, 242, 243, 244, and 245 of the second lens assembly 240 according to one embodiment of the present invention have such a refractive power that properly corrects for spherical aberration and chromatic aberration according to the conditional expressions 1 to 5. For example, according to the Referring to Table 1, the conditional expression (|Kn/Kt|) for the first to fifth lenses 241, 242, 243, 244, and 245 equals 0.165835, 0.721885, 0.59867, 1.230489, and 0.729485. Thus, it can be seen that the above conditional expressions 1 to 5 are met.

The f-number of the second lens assembly 240 according to one embodiment of the present invention is 2.4, and its half field of view (HFOV) is 60 degrees. Herein, f-number represents the brightness of a lens, which is denoted by F=f/d where f denotes the focal length of the optical system and D denotes diameter. Normally, the lower the f-number, the brighter the lens. Accordingly, the f-number of the second lens assembly 240 according to one embodiment of the present invention is 2.4. Thus, it can be found out that a bright image can be acquired through the second lens assembly.

HFOV is equal to ½ of the angle of view of a scene captured by a camera lens. The HFOV of the second lens assembly 240 according to one embodiment of the present invention is 60 degrees. Thus, it can be found out that a wide field of view can be achieved through the second lens assembly 240.

The following Table 2 shows the aspherical coefficients of the lenses of the second lens assembly 240 according to the embodiment shown in Table 1.

TABLE 2

| Type | First lens | | Second lens | | Third lens | |
|---|---|---|---|---|---|---|
| | First surface | Second surface | First surface | Second surface | First surface | Second surface |
| K | 0 | 32.220706 | −1.42538872 | 13.589672 | 52.992489 | −34.64334 |
| A4 | −0.0003911 | 0.030091 | −0.03098226 | −0.533094 | −0.965727 | −0.104766 |
| A6 | −8.06E−02 | −9.03E−02 | −1.38E−01 | 4.23E−01 | 0.6021112 | −0.307388 |
| A8 | 7.77E−03 | −8.54E−03 | −1.97E+00 | −4.35E−01 | 1.0886464 | 8.06E−01 |
| A10 | 2.53E−02 | 2.97E−01 | 3.70E+00 | −3.60E+00 | −3.529558 | 7.31E−01 |
| A12 | 2.09E−02 | 5.90E−01 | −1.30E+01 | 1.79E+00 | 4.07E+00 | −5.29E+00 |
| A14 | 1.43E−01 | −9.67E−01 | 0 | 0 | 0 | 0 |
| A16 | −0.3859369 | 0 | 0 | 0 | 0 | 0 |
| A18 | 0 | 0 | 0 | 0 | 0 | 0 |
| A20 | 0 | 0 | 0 | 0 | 0 | 0 |

| Type | Fourth lens | | Fifth lens | |
|---|---|---|---|---|
| | First surface | Second surface | First surface | Second surface |
| K | 0 | −1.569881 | −2.27531564 | −2.5578899 |
| A4 | 0.1021266 | −0.022486 | −0.54670039 | −0.4128839 |
| A6 | −0.11887 | 0.0621549 | 0.24368777 | 0.3614059 |
| A8 | −0.161921 | −0.341976 | −0.01830199 | −0.1927565 |
| A10 | 0.2310045 | 4.11E−01 | −0.02529653 | 3.78E−02 |
| A12 | 1.22E+00 | 8.07E−01 | 0.02376573 | −0.011756 |
| A14 | 0 | 0 | 0 | 0 |
| A16 | 0 | 0 | 0 | 0 |
| A18 | 0 | 0 | 0 | 0 |
| A20 | 0 | 0 | 0 | 0 |

FIG. 14 is a graph showing astigmatic field curves of the second lens assembly 240 according to one embodiment of the present invention. FIG. 15 is a graph showing measurements of distortion of the second lens assembly 240 according to one embodiment of the present invention, In FIG. 14, the Y-axis indicates the size of an image, and the X-axis indicates focal length (measured in mm). In FIG. 15, the Y-axis indicates the size of an image, and the X-axis indicates the degree of distortion (measured in %). In general, the closer to the Y-axis the curves in an aberration diagram, the better the aberration correction. As can be seen from the aberration diagrams of FIGS. 14 and 15, the values of images in almost every field are close to the Y-axis, and this shows that both the astigmatic field and the distortion are small.

Embodiments of the present invention are applicable to a mobile terminal with a lens assembly capable of wide-angle shooting.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

INDUSTRIAL APPLICABILITY

The embodiments of the present invention may be applied to a mobile terminal having a camera module.

The invention claimed is:
1. A camera module comprising:
a first lens assembly with a variable focal length;
a second lens assembly provided under the first lens assembly, and spaced apart therefrom;
a controller; and
an image sensor provided under the second lens assembly,
wherein the second lens assembly corrects a spherical aberration of the first lens assembly according to a field of view (FOV) of the first lens assembly,
wherein the second lens assembly comprises:
a first lens having a positive (+) refractive power;
a second lens having a positive (+) refractive power;
a third lens having a negative (−) refractive power;
a fourth lens having a positive (+) refractive power;
a fifth lens having a negative (−) refractive power; and
an aperture provided between the first and second lenses,
all of which are arranged in order of proximity to the first lens assembly,
wherein the first lens assembly comprises:
a piezo film with a through hole that bends in response to an electrical signal applied thereto;

a glass membrane provided under the piezo film and
bending into a shape corresponding to the piezo film;
a polymer lens provided under the glass membrane and
formed in an area corresponding to the through hole,
with a top surface of the polymer lens being deformable
into a shape corresponding to a bottom surface of the
glass membrane; and
a glass support provided under the polymer lens,
wherein when a voltage is applied to the piezo film, a
shape of the piezo film is deformed and a shape of the
glass membrane placed in contact with the piezo film is
deformed, and the glass membrane leads to deformation of one side of the polymer lens so that a focus of
the polymer lens is changed,
wherein the controller adjusts a lens thickness of the first
lens assembly when the field of view is more than 100
degrees, to a first state in which the lens thickness of the
first lens assembly is not varied for wide-angle shooting
mode, and
wherein the controller adjusts the lens thickness of the
first lens assembly when the field of view is 100
degrees or less, to a second state in which the lens
thickness of the first lens assembly is varied by the
application of the voltage to the first lens assembly for
normal-angle shooting mode.

2. The camera module of claim 1, wherein the camera module further comprises an actuator provided between the second lens assembly and the image sensor and aligning the optical axes of the first and second lens assemblies with a center of the image sensor.

3. The camera module of claim 1, wherein the first lens assembly is an actuator that aligns the optical axes of the first and second lens assemblies with a center of the image sensor.

4. The camera module of claim 1, further comprising an actuator provided under the image sensor and aligning the optical axes of the first and second lens assemblies with a center of the image sensor.

5. The camera module of claim 1, wherein the first and third lenses have a refractive index of 1.6 or higher.

6. The camera module of claim 1, wherein at least one side of the first to fifth lenses is aspherical.

7. The camera module of claim 1, wherein the first lens satisfies the following expression (1):

$$0.1 < |K1/Kt| < 0.5 \qquad (1)$$

where $K1$ is the refractive power of the first lens, and $Kt$ is the refractive power of the second lens assembly.

8. The camera module of claim 1, wherein the second lens satisfies the following expression (2):

$$0.5 < |K2/Kt| < 1.0 \qquad (2)$$

where $K2$ is the refractive power of the second lens, and $Kt$ is the refractive power of the second lens assembly.

9. The camera module of claim 1, wherein the third lens satisfies the following expression (3):

$$0.3 < |K3/Kt| < 1.0 \qquad (3)$$

where $K3$ is the refractive power of the third lens, and $Kt$ is the refractive power of the second lens assembly.

10. The camera module of claim 1, wherein the fourth lens satisfies the following expression (4):

$$1.0 < |K4/Kt| < 1.5$$

where $K4$ is the refractive power of the fourth lens, and $Kt$ is the refractive power of the second lens assembly.

11. The camera module of claim 1, wherein the fifth lens satisfies the following expression (5):

$$0.5 < |K5/Kt| < 1.0$$

where $K5$ is the refractive power of the fifth lens, and $Kt$ is the refractive power of the second lens assembly.

12. The camera module of claim 1, wherein the wider the field of view (FOV), the smaller the radius of curvature of the first lens assembly.

13. The camera module of claim 1, wherein the first lens assembly performs an autofocus function by varying the lens thickness in the second state, and performs a wide-field-of-view shooting function by keeping the lens thickness constant in the first state.

14. A mobile terminal comprising:
a camera module;
a controller; and
a terminal body having the camera module,
the camera module comprising:
a first lens assembly with a variable focal length;
a second lens assembly provided under the first lens assembly, and spaced apart therefrom; and
an image sensor provided under the second lens assembly,
wherein the second lens assembly corrects a spherical aberration of the first lens assembly according to a field of view (FOV) of the first lens assembly,
wherein the second lens assembly comprises:
a first lens having a positive (+) refractive power;
a second lens having a positive (+) refractive power;
a third lens having a negative (−) refractive power;
a fourth lens having a positive (+) refractive power;
a fifth lens having a negative (−) refractive power; and
an aperture provided between the first and second lenses,
all of which are arranged in order of proximity to the first lens assembly,
wherein the first lens assembly comprises:
a piezo film with a through hole that bends in response to an electrical signal applied thereto;
a glass membrane provided under the piezo film and bending into a shape corresponding to the piezo film;
a polymer lens provided under the glass membrane and formed in an area corresponding to the through hole, with a top surface of the polymer lens being deformable into a shape corresponding to a bottom surface of the glass membrane; and
a glass support provided under the polymer lens,
wherein when a voltage is applied to the piezo film, a shape of the piezo film is deformed and a shape of the glass membrane placed in contact with the piezo film is deformed, and the glass membrane leads to deformation of one side of the polymer lens so that a focus of the polymer lens is changed,
wherein the controller adjusts a lens thickness of the first lens assembly when the field of view is more than 100 degrees, to a first state in which the lens thickness of the first lens assembly is not varied for wide-angle shooting mode, and
wherein the controller adjusts the lens thickness of the first lens assembly when the field of view is 100 degrees or less, to a second state in which the lens thickness of the first lens assembly is varied by the application of the voltage to the first lens assembly for normal-angle shooting mode.

* * * * *